Nov. 4, 1947.　　　O. E. NICHOLS　　　2,430,242
FORK WITH STRIPPING MEANS
Original Filed March 27, 1939
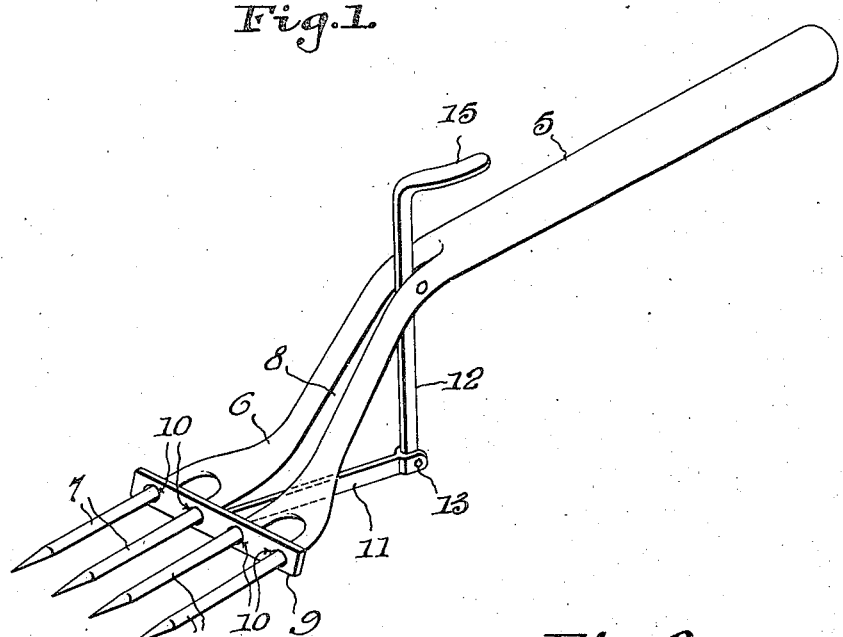
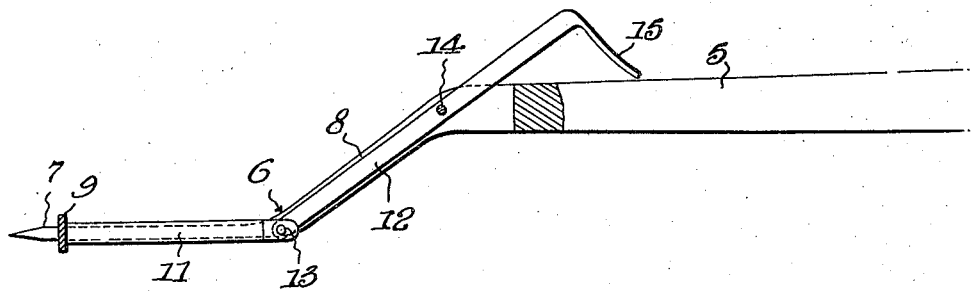
Inventor
Okey E. Nichols
WITNESS
H. Woodard
By H. R. Willson &co
Attorneys Patented Nov. 4, 1947

2,430,242

UNITED STATES PATENT OFFICE 2,430,242

FORK WITH STRIPPING MEANS

Okey E. Nichols, Charleston, W. Va.

Substituted for abandoned application Serial No. 264,499, March 27, 1939. This application April 2, 1946, Serial No. 658,965

1 Claim. (Cl. 30—129)

The invention of this application formed the subject matter of my application Serial No. 264,499 which was filed March 27, 1939, and allowed May 22, 1940, but which became abandoned through failure to pay the final Government fee within the time allowed by law.

The invention aims to provide a new and improved fork with stripping means for use primarily in grocery stores for handling such items as dry fruits, sauerkraut, salt fish, pickles, etc., the construction being such that the user of the fork may easily clean all material from the tines thereof and push the same into the bag or other container into which such material is being deposited.

With the foregoing in view, the invention resides in the novel construction hereinafter described and claimed, description being accomplished by reference to the accompanying drawing.

Figure 1 is a perspective view showing the normal relation of parts.

Figure 2 is a central vertical longitudinal sectional view showing the tine-cleaning plate moved to the front ends of the tines.

A preferred construction has been illustrated and will be rather specifically described, with the understanding however, that minor changes may be made within the scope of the invention as claimed.

The numeral 5 on the drawing denotes an elongated handle having a downwardly and forwardly directed front end 6 which is provided with forwardly projecting tines 7. The portion 6 is formed with a central longitudinal slot 8 which opens into the space between two of the tines 7 and preferably extends rearwardly to the point at which the handle portion 6 joins the major handle portion 5.

A tine cleaning plate 9 extends transversely of the tines 7 and is formed with openings 10 through which said tines pass, said plate 9 being provided with a rearwardly projecting rod 11 which is preferably rigidly secured at its front end thereto. This rod extends through the lower end of the slot 8, and a substantially vertical lever 12 extends through the upper end of said slot, the lower end of said lever being pivoted to the rear end of said rod as indicated at 13. The lever 12 is fulcrumed between its ends to the fork handle as shown at 14, and the upper end of said lever is provided with a rearwardly projecting thumb piece 15 spaced upwardly from said handle.

The parts normally occupy the relative positions shown in Fig. 1 but whenever the material being handled by the fork is to be pushed forwardly from the tines, it is simply necessary to use the thumb to operate the lever 12, thus effecting forward sliding of the plate 9 to attain the desired end. When the lever 12 is operated to forwardly move the plate 9, said lever swings forwardly into the slot 8 as seen in Fig. 2 effecting maximum forward movement of said plate 9.

If the fork be used in handling sauerkraut, cooked spaghetti, or the like, some of the strands, shreds or the like may often fall over the plate 9, onto the portion 6 and into the slot 8, but when the lever 12 swings forwardly into said slot, it will eject anything therein and anything lying upon said portion 6.

It will be seen from the foregoing that the device is simple and inexpensive, yet very desirable and efficient, and that it overcomes the necessity of clerks using their hands upon various kinds of produce being sold. While the details disclosed are preferred, attention is again invited to the possibility of making minor variations within the scope of the invention as claimed.

I claim:

A fork comprising a handle having a downwardly and forwardly directed front end portion provided with forwardly projecting tines, said downwardly and forwardly directed portion being provided with a central longitudinal slot which opens into the space between two of said tines, a tine-cleaning plate having openings through which said tines extend, a rod connected with said plate and extending rearwardly through the lower end of said slot, and a substantially vertical lever passing through said slot and pivoted between its ends to said handle, the lower end of said lever being pivoted to the lower end of said rod, said lever having a thumb-piece on its upper end spaced above said handle for operating said lever to forwardly move said tine-cleaning plate, said lever being swingable into the aforesaid slot to push said plate forwardly to the maximum, and to eject any material which might otherwise lodge in said slot and upon said downwardly and forwardly directed front end portion of said handle.

OKEY E. NICHOLS.

REFERENCES CITED

The following references are of record in the file of this patent:

UNITED STATES PATENTS

| Number | Name | Date |
|---|---|---|
| 1,255,945 | Stimecz | Feb. 12, 1918 |